US012561099B2

(12) United States Patent　　　(10) Patent No.:　US 12,561,099 B2
Tian et al.　　　　　　　　　　　　(45) Date of Patent:　　Feb. 24, 2026

(54) DISTRIBUTED DATA STORAGE CONTROL METHOD AND APPARATUS, AND ELECTRONIC DEVICE

(71) Applicant: Beijing Volcano Engine Technology Co., Ltd., Beijing (CN)

(72) Inventors: Yangfeng Tian, Beijing (CN); Jie Wang, Beijing (CN); Peng Li, Beijing (CN); Jinfeng Yang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/790,478

(22) Filed: Jul. 31, 2024

(65) Prior Publication Data

US 2025/0217081 A1　　Jul. 3, 2025

(30) Foreign Application Priority Data

Dec. 29, 2023　(CN) .......................... 202311866662.2

(51) Int. Cl.
*G06F 3/06*　　　　(2006.01)

(52) U.S. Cl.
CPC ........... *G06F 3/067* (2013.01); *G06F 3/0604* (2013.01)

(58) Field of Classification Search
CPC .............................. G06F 3/067; G06F 3/0604
USPC ......................................................... 709/225
See application file for complete search history.

(56) References Cited

U.S. PATENT DOCUMENTS

| | | | | |
|---|---|---|---|---|
| 8,930,333 | B1 * | 1/2015 | Prince | G06F 16/1774 |
| | | | | 707/704 |
| 2022/0350787 | A1 | 11/2022 | Shveidel | |
| 2025/0199711 | A1 * | 6/2025 | Saxena | G06F 3/0604 |

FOREIGN PATENT DOCUMENTS

| | | | |
|---|---|---|---|
| CN | 2017180143 A | 10/2017 | |
| CN | 109302448 A | 2/2019 | |
| CN | 106713250 B | 8/2019 | |
| CN | 109302448 B * | 10/2020 | ........... H04L 67/568 |
| CN | 112804279 A | 5/2021 | |
| CN | 113296904 A | 8/2021 | |
| CN | 114647655 A | 6/2022 | |
| CN | 116737685 A | 9/2023 | |

OTHER PUBLICATIONS

Notice of Grant issued in CN Appl. No. 202311866662.2 mailed Nov. 20, 2025, English translation (12 pages).

* cited by examiner

*Primary Examiner* — Wing F Chan
*Assistant Examiner* — Leon Y Tseng

(57) ABSTRACT

Embodiments of the present disclosure provide a distributed data storage control method and apparatus, and an electronic device. The method includes: receiving, by a proxy node, a first change request for a target file in a NAS cluster, wherein the first change request is used to directly or indirectly trigger to change target metadata of the target file; allocating, by a distributed lock control node in the NAS cluster in response to the first change request, a corresponding distributed lock, and returning first response message to the proxy node; receiving, by the proxy node, the first response message, and configuring a corresponding local memory lock for the distributed lock corresponding to the first change request; and controlling a change of the target metadata of the target file in the NAS cluster based on the (Continued)

first change request with the distributed lock and the local memory lock.

20 Claims, 6 Drawing Sheets

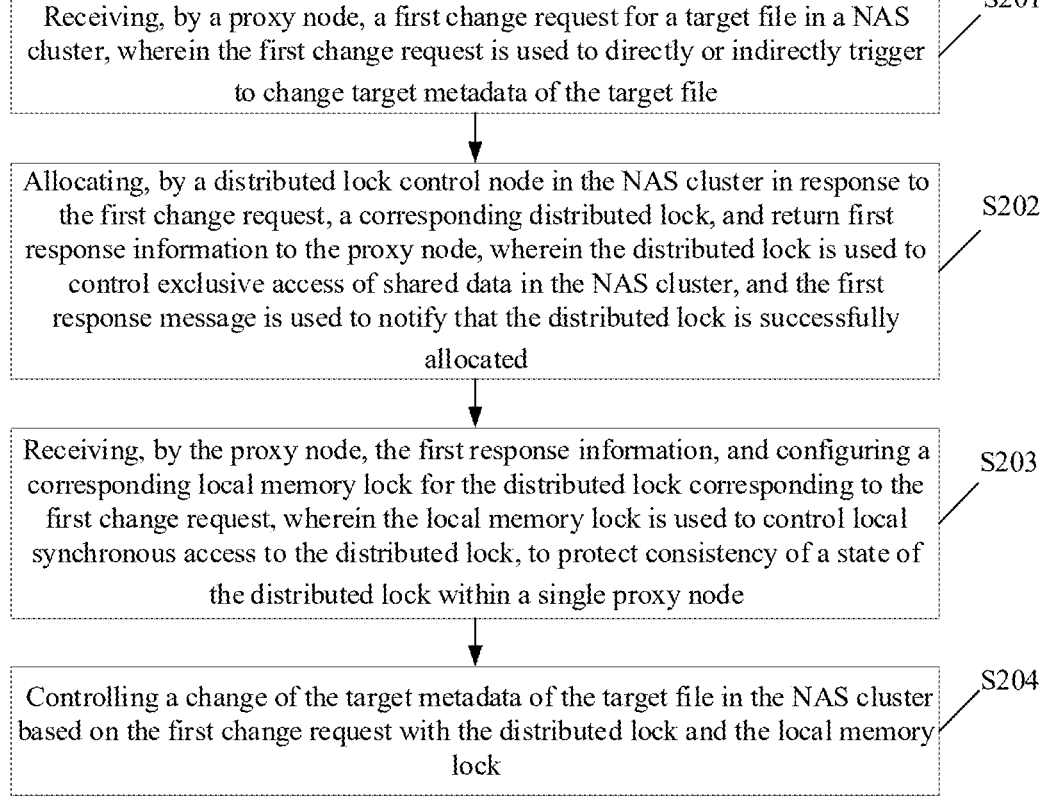

Receiving, by a proxy node, a first change request for a target file in a NAS cluster, wherein the first change request is used to directly or indirectly trigger to change target metadata of the target file        S201

Allocating, by a distributed lock control node in the NAS cluster in response to the first change request, a corresponding distributed lock, and return first response information to the proxy node, wherein the distributed lock is used to control exclusive access of shared data in the NAS cluster, and the first response message is used to notify that the distributed lock is successfully allocated        S202

Receiving, by the proxy node, the first response information, and configuring a corresponding local memory lock for the distributed lock corresponding to the first change request, wherein the local memory lock is used to control local synchronous access to the distributed lock, to protect consistency of a state of the distributed lock within a single proxy node        S203

Controlling a change of the target metadata of the target file in the NAS cluster based on the first change request with the distributed lock and the local memory lock        S204

Fig. 2

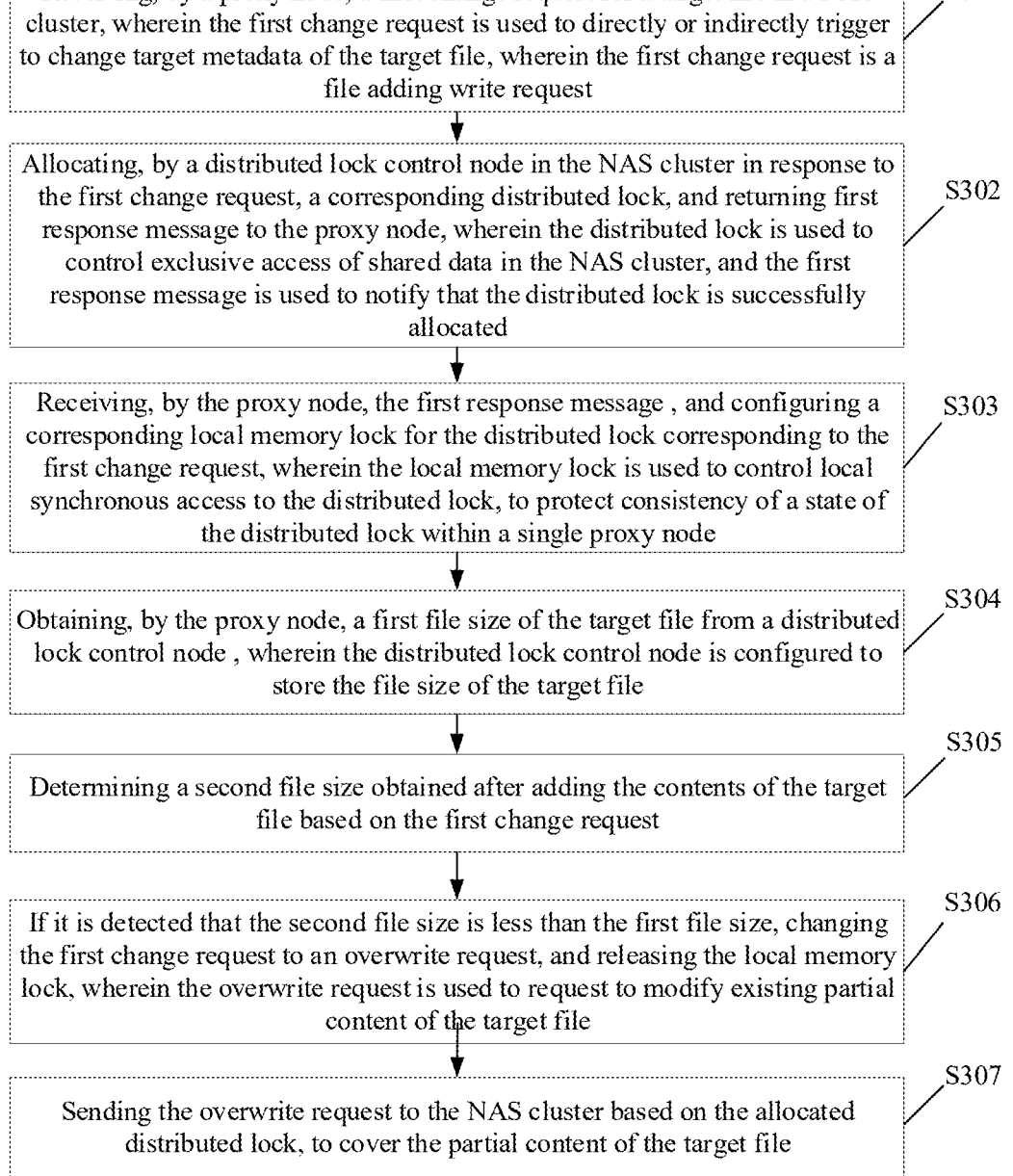

Receiving, by a proxy node, a first change request for a target file in a NAS cluster, wherein the first change request is used to directly or indirectly trigger to change target metadata of the target file, wherein the first change request is a file adding write request                                                                  S301

Allocating, by a distributed lock control node in the NAS cluster in response to the first change request, a corresponding distributed lock, and returning first response message to the proxy node, wherein the distributed lock is used to control exclusive access of shared data in the NAS cluster, and the first response message is used to notify that the distributed lock is successfully allocated                                                                  S302

Receiving, by the proxy node, the first response message , and configuring a corresponding local memory lock for the distributed lock corresponding to the first change request, wherein the local memory lock is used to control local synchronous access to the distributed lock, to protect consistency of a state of the distributed lock within a single proxy node                                                                  S303

Obtaining, by the proxy node, a first file size of the target file from a distributed lock control node , wherein the distributed lock control node is configured to store the file size of the target file                                                                  S304

Determining a second file size obtained after adding the contents of the target file based on the first change request                                                                  S305

If it is detected that the second file size is less than the first file size, changing the first change request to an overwrite request, and releasing the local memory lock, wherein the overwrite request is used to request to modify existing partial content of the target file                                                                  S306

Sending the overwrite request to the NAS cluster based on the allocated distributed lock, to cover the partial content of the target file                                                                  S307

Fig. 3

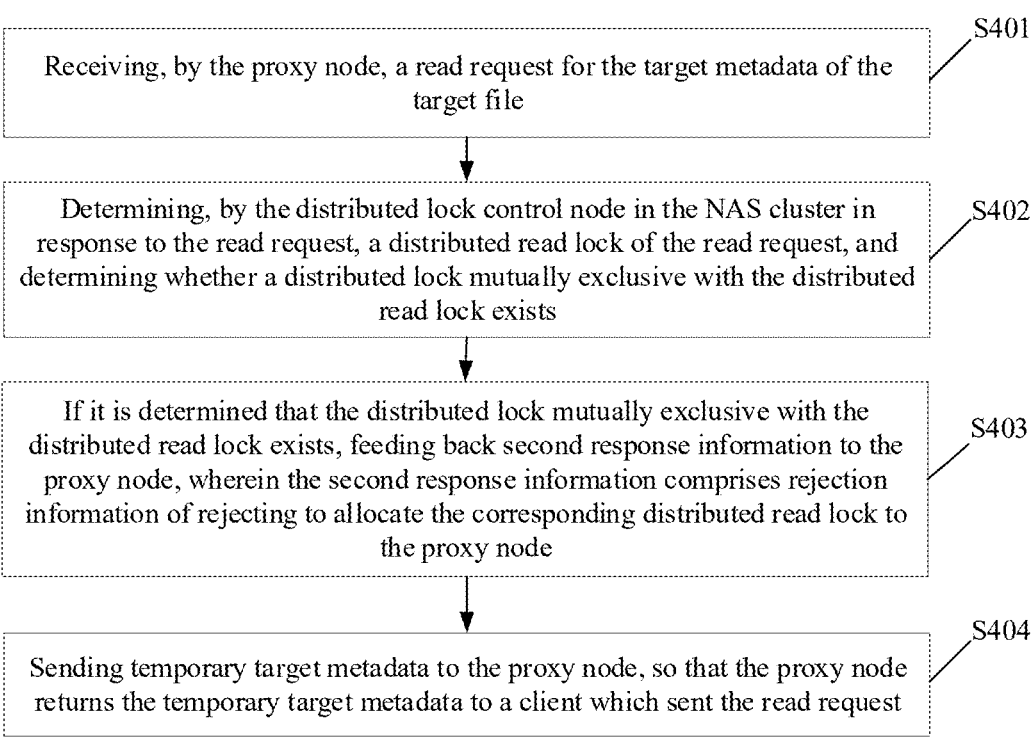

Receiving, by the proxy node, a read request for the target metadata of the target file                    S401

Determining, by the distributed lock control node in the NAS cluster in response to the read request, a distributed read lock of the read request, and determining whether a distributed lock mutually exclusive with the distributed read lock exists                    S402

If it is determined that the distributed lock mutually exclusive with the distributed read lock exists, feeding back second response information to the proxy node, wherein the second response information comprises rejection information of rejecting to allocate the corresponding distributed read lock to the proxy node                    S403

Sending temporary target metadata to the proxy node, so that the proxy node returns the temporary target metadata to a client which sent the read request                    S404

Fig. 4

Distributed Storage Control Apparatus 60

601 — Receiving Unit

602 — Allocation Unit

603 — Configuration Unit

604 — Execution Unit

Electronic Device 700

701 — Processing Apparatus

702 — ROM

703 — RAM

704

705 — I/O Interface

706 — Input Apparatus

707 — Output Apparatus

708 — Storage Apparatus

709 — Communication Apparatus

1

DISTRIBUTED DATA STORAGE CONTROL METHOD AND APPARATUS, AND ELECTRONIC DEVICE

CROSS-REFERENCE TO RELATED APPLICATION

This application claims the priority to and benefits of the Chinese Patent Application, No. 202311866662.2, which was filed on Dec. 29, 2023. The aforementioned patent application is hereby incorporated by reference in its entirety.

TECHNICAL FIELD

Embodiments of the present disclosure relate to the field of Internet technologies, and in particular, to a distributed data storage control method and apparatus, and an electronic device.

BACKGROUND

A network attached storage (NAS) cluster is a cluster storage device designed specifically for storing and sharing files, which is usually connected to a network over which the stored files can be accessed and managed. A NAS storage device may be directly connected in an Ethernet, and then hosts with different types of operating systems within the network domain can access the cluster device.

A plurality of users may send access requests to the NAS cluster by using clients. To alleviate pressure on the NAS cluster from a plurality of access requests, a plurality of proxy nodes may be disposed. FIG. 1 is a schematic diagram of an application scenario. As shown in FIG. 1, a plurality of proxy nodes are disposed between the NAS cluster and a plurality of clients, and access requests sent by the plurality of clients can be allocated for the proxy nodes based on load balancing. The proxy node may parse the received access request and send the parsed access request to a back-end storage cluster of a NAS storage architecture.

In a process of parsing a user access request, the proxy node needs to interact with the NAS cluster. In order to enable the plurality of proxy nodes to resolve the conflict caused by accessing the NAS device concurrently and consistency of metadata obtained from the NAS by different proxy nodes, the plurality of proxy nodes may access the NAS cluster by using a distributed lock, to obtain target metadata from the NAS cluster and buffer the target metadata. In some application scenarios, there is a problem of inconsistency between the target metadata buffered in the proxy nodes and the target metadata in the NAS cluster.

SUMMARY

The embodiment of the present disclosure provides a distributed data storage control method and apparatus, and an electronic device.

In a first aspect, an embodiment of the present disclosure provides a distributed data storage control method, comprising: receiving, by a proxy node, a first change request for a target file in a NAS cluster, wherein the first change request is used to directly or indirectly trigger to change target metadata of the target file; allocating, by a distributed lock control node in the NAS cluster in response to the first change request, a corresponding distributed lock, and returning first response message to the proxy node, wherein the distributed lock is used to control exclusive access of shared data in the NAS cluster, and the first response message is used to notify that the distributed lock is successfully allocated; receiving, by the proxy node, the first response message, and configuring a corresponding local memory lock for the distributed lock corresponding to the first change request, wherein the local memory lock is used to control local synchronous access to the distributed lock, to protect consistency of a state of the distributed lock inside the single proxy node; and controlling a change of the target metadata of the target file in the NAS cluster based on the first change request with the distributed lock and the local memory lock.

In a second aspect, an embodiment of the present disclosure provides a distributed data storage control apparatus, comprising: a receiving unit, configured to receive, by a proxy node, a first change request for a target file in a NAS cluster, wherein the first change request is used to directly or indirectly trigger to change target metadata of the target file; an allocation unit, configured to: allocate, by a distributed lock control node in the NAS cluster in response to the first change request, a corresponding distributed lock, and return first response message to the proxy node, wherein the distributed lock is used to control exclusive access of shared data in the NAS cluster, and the first response message is used to notify that the distributed lock is successfully allocated; a configuration unit, configured to: receive, by the proxy node, the first response message, and configure a corresponding local memory lock for the distributed lock corresponding to the first change request, wherein the local memory lock is used to control local synchronous access to the distributed lock, to protect consistency of a state of the distributed lock inside the single proxy node; and an execution unit, configured to control a change of the target metadata of the target file in the NAS cluster based on the first change request with the distributed lock and the local memory lock.

In a third aspect, an embodiment of the present disclosure provides an electronic device, comprising a processor and a memory, wherein the memory stores computer-executable instructions; and the processor executes the computer-executable instructions stored in the memory, so that the processor performs methods according to the first aspect and various possible methods according to the first aspect described above.

In a forth aspect, an embodiment of the present disclosure provides a computer-readable storage medium, wherein the computer-readable storage medium stores computer-executable instructions, and when a processor executes the computer-executable instructions, methods according to the first aspect and various possible methods according to the first aspect are implemented described above.

In a fifth aspect, an embodiment of the present disclosure provides a computer program product, including a computer program, when executed by a processor, implements methods according to the first aspect and various possible methods according to the first aspect described above.

The distributed data storage control method and apparatus, and an electronic device provided by the present disclosure can avoid the problem of inconsistency between the target metadata and the target metadata in the NAS cluster caused by the distributed locks being robbed, by receiving, by a proxy node, a first change request for a target file in a NAS cluster, where the first change request is used to directly or indirectly trigger to change target metadata of the target file; allocating, by a distributed lock control node in the NAS cluster in response to the first change request, a corresponding distributed lock, and returning first response message to the proxy node, where the distributed lock is used to control exclusive access of shared data in the NAS cluster, and the first response message is used to notify that the distributed lock is successfully allocated; receiving, by the proxy node, the first response message, and configuring a corresponding local memory lock for the distributed lock corresponding to the first change request, where the local memory lock is used to control local synchronous access to the distributed lock, to protect consistency of a state of the distributed lock inside the single proxy node; and controlling a change of the target metadata of the target file in the NAS cluster based on the first change request with the distributed lock and the local memory lock. This resolves the problem of errors in the target metadata caused by concurrent modifications of a plurality of proxy nodes on the target metadata of the file.

BRIEF DESCRIPTION OF DRAWINGS

In order to explain the embodiments of the present disclosure or the technical scheme in the prior art more clearly, the drawings needed in the description of the embodiments or the prior art will be briefly introduced below. Obviously, the drawings in the following description are some embodiments of the present disclosure, and other drawings can be obtained according to these drawings without creative labor.

FIG. 2 is a flowchart 1 of a data access method according to an embodiment of the present disclosure;

FIG. 3 is a flowchart of a scenario;

FIG. 4 is a flowchart 2 of a data access method according to an embodiment of the present disclosure;

DETAILED DESCRIPTION

Figure 1:
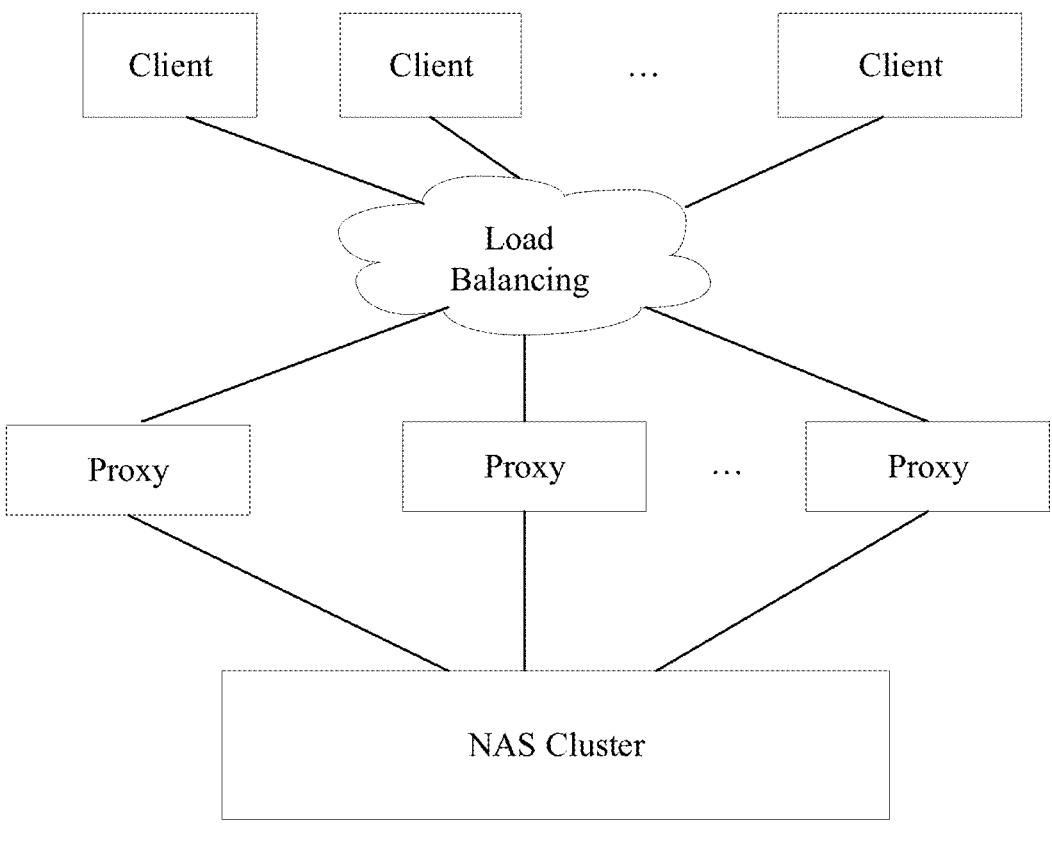
FIG. 1 is a schematic diagram of an application scenario.

In order to make the purpose, technical scheme and advantages of the embodiment of the present disclosure more clear, the technical scheme in the embodiment of the disclosure will be described clearly and completely with the attached drawings. Obviously, the described embodiment is a part of the embodiment of the disclosure, but not the whole embodiment. Based on the embodiment in this disclosure, all other embodiments obtained by ordinary technicians in this field without creative work belong to the protection scope of this disclosure.

In a NAS storage architecture, file data is divided into data and metadata. The data is actual data in a file, that is, actual content of the file. The metadata of the file is system data used to describe features of a file. The metadata of the file is, for example, a file name, a file size, a file type, an owner, issue time, update time of file content, and the like.

A NAS cluster includes a plurality of data block service nodes (BlockServer, BS for short) and a distributed lock control node.

A proxy node may buffer metadata information obtained from the NAS cluster. In addition, a user may initiate a file change request to the NAS cluster through the proxy node, and the change request may change the metadata of the file.

In addition, a plurality of users may concurrently initiate change requests that cause the metadata to change. In order to resolve the conflict caused by concurrency of metadata change requests from multiple users, distributed locks may be used to control the change requests for the file of each proxy node, to resolve the problem that different proxy nodes compete for NAS resources.

For a change request to directly or indirectly update target metadata of a file, a proxy node needs to apply for a distributed lock to the distributed lock control node of the NAS cluster. When the proxy node applies for the distributed lock from the distributed lock control node according to the foregoing change request of a client, the distributed lock control node needs to revoke an allocated distributed lock according to a conflict rule between distributed locks, and then allocate the corresponding distributed lock to the proxy node applying for the distributed lock. When another proxy node receives a revoke request for a distributed lock from the distributed lock control node, the proxy node will directly invalidates distributed lock and buffered target metadata it holds.

After the distributed lock control node allocates the distributed lock to the proxy node, the proxy node may initiate, to a data block proxy node in the NAS cluster according to the distributed lock of the proxy node, a write request to directly or indirectly change the target metadata of the file. If the distributed lock of the proxy node is revoked in this process, there will be a problem of errors in metadata that are caused by inconsistency between the target metadata in the NAS cluster and the target metadata buffered by the proxy node.

In the present disclosure, metadata taken as an example to represent a file size is used for illustration. If a current file size of a file F1 is 1M, a change request of a proxy node 1 for the file F1 is to add new content to an interval [1M, 2M), and the proxy node 1 holds a distributed lock and initiates a write request to a data block service node of the NAS cluster. Meanwhile, a proxy node 2 concurrently sends a file size update request (Truncate request) to the NAS cluster to update the file size of the file F1. The file size update request changes the file size of the file F1 to 0M. The proxy node 2 needs to apply for a distributed lock to the distributed lock control node for the file size update request, and the distributed lock control node initiates a revoke request to revoke the distributed lock held by the proxy node.

The proxy node 1 immediately releases the distributed lock held by the proxy node 1 after receiving the revoke request from the distributed lock control node. Subsequently, the distributed lock control node allocates a distributed lock to the proxy node 2, and the proxy node 2 sends the file size update request to the data block service node after obtaining the distributed lock. It is assumed that the data block service node first adds new content in a range of (1M, 2M] to the file F1 based on the change request from the node 1 and updates the file size of the target file to 2M in the data block service node. The data block service node then updates the size of the target file to 0M based on the file size update request from the proxy node 2.

However, the proxy node 1 first receives content adding success response information of adding new content successfully sent by the data block service node in the NAS cluster, and prepares to update the file size of the file F1 buffered by the proxy node 1, but discovers that a distributed write lock of the proxy node 1 is invalid, and needs to reapply for a distributed lock at the distributed lock control node. Before the distributed lock control node processes a distributed lock request reapplied by the proxy node 1, the proxy node 2 receives update success response information for the size update request from the data block service node, and the proxy node 2 updates the size of the file F1 to 0 in a buffer, and the distributed lock of the proxy node 2 is subsequently revoked. The proxy node 1 obtains the distributed lock and modifies the file size of the file F1 buffered by the proxy node 1 to 2M. This results in inconsistency between the file size 2M of the file F1 buffered in the proxy node 1 and the true size 0M of the file in the BS. Therefore, in the forgoing process, due to concurrency of the change requests from the proxy nodes for the target metadata of the file F1, in the process in which the proxy node F1 directly or indirectly changes the target metadata of the file based on the distributed lock, competition of another proxy node causes the distributed lock held by the proxy node F1 to be invalid, which leads to the inconsistency between the buffered target metadata of the proxy node F1 and the true target metadata in the data block service node in the NAS cluster, resulting in metadata confusion of the file.

In the solution provided in the present disclosure, a distributed lock is allocated to a first change request of a proxy node, and a memory lock is added to the distributed lock. The memory lock is configured to control local synchronous access to the distributed lock, and protect state consistency of the distributed lock within a single proxy node. In a process in which the proxy node directly or indirectly changes the target metadata of the target file according to the distributed lock, the distributed lock will not be revoked, that is, the distributed lock held by the proxy node will not be invalid in the process of modifying the target metadata. Therefore, the target metadata in the proxy node is consistent with the true target metadata in data of the NAS cluster. In this way, the problem of errors in the target metadata caused by invalidity of the distributed lock held by the proxy node in the target metadata change process can be resolved when a plurality of proxy nodes concurrently change the target metadata of the target file.

FIG. 2 is a flowchart 1 of a distributed data storage control method according to an embodiment of the present disclosure. As shown in FIG. 2, the distributed data storage control method includes the following steps:

S201, receiving, by a proxy node, a first change request for a target file in a NAS cluster, wherein the first change request is used to directly or indirectly trigger to change target metadata of the target file.

S202, allocating, by a distributed lock control node in the NAS cluster in response to the first change request, a corresponding distributed lock, and return first response message to the proxy node, wherein the distributed lock is used to control exclusive access of shared data in the NAS cluster, and the first response message is used to notify that the distributed lock is successfully allocated.

In this embodiment, the NAS cluster may include the distributed lock control node and a plurality of data block service nodes. The data block service nodes are responsible for read and write operations of the file and for storing file data. The distributed lock control node is responsible for distributed lock services. In addition, after performing a corresponding operation according to the first change request to cause a change to the target metadata of the target file, the data block service node may synchronize the target metadata to the distributed lock control node. The distributed lock control node may store metadata information of the target file.

The proxy node may be any one of a plurality of proxy nodes corresponding to the NAS cluster. The target file may be any file shared in the NAS cluster.

The target metadata may be one or more attributes of the target file, for example, may be a file size attribute representing a size of the target file.

The proxy node may receive the first change request from a client.

In some application scenarios, the first change request may directly request to change the target metadata of the target file. For example, a truncate request is sent to the NAS cluster, wherein the request may indicate to change the target metadata.

In some application scenarios, the first change request may indirectly request to change the target metadata of the target file. For example, the first change request may request to change one piece of data of the target file to cause a change to the target metadata.

In some embodiments, the target metadata is used to represent a file size of the target file; and the first change request includes one of the following:

a file adding write request, where the file adding write request is used to request to add file content to the target file, and change of the metadata of the target file is triggered when execution of a file content adding operation corresponding to the file adding write request is completed; or, a metadata update request, where the metadata update request is used to request to change the metadata of the target file.

In some application scenarios, the first change request includes the file adding write request. The file adding write request adds new file content to the target file, where the file adding write request may change the size of the target file. The first change request may include an instruction of target file. write (character string). The target file. write ( ) is used to write content into the target file, and the character string may include a write range and a write content.

In some application scenarios, the first change request may be the metadata update request for changing the file size. The first update request may include, for example, a truncate statement for directly updating the file size. The truncate statement may directly update the file size of the target file. For example, the truncate statement may be used to update the file size of the target file to 0M, that is, directly clear content of the target file. For another example, the truncate statement may be used to update the target file to a specified size, and the data block service node may delete one or more segments of data at the end of the target file based on the specified size according to the truncate statement.

After receiving the first change request, the proxy node may apply for a distributed lock to the distributed lock control node of the NAS cluster. In an implementation, the distributed lock may be a distributed write lock.

After receiving the application of obtaining the distributed lock, the distributed lock control node may detect whether an allocated distributed lock mutually exclusive with the distributed lock exists currently. If it is determined that the result is yes, a revoke request may be sent to another proxy node to which the mutually exclusive distributed lock has been allocated. After detecting that another proxy node revokes the distributed lock according to the revoke request, the distributed lock control node allocates a distributed lock to the proxy node.

After successfully allocating the distributed lock to the proxy node, the distributed lock control node may send the first response message to the proxy node, to notify the proxy node that the distributed lock is successfully allocated.

S203, receiving, by the proxy node, the first response message, and configuring a corresponding local memory lock for the distributed lock corresponding to the first change request, wherein the local memory lock is used to control local synchronous access to the distributed lock, to protect consistency of a state of the distributed lock within a single proxy node.

S204, controlling a change of the target metadata of the target file in the NAS cluster based on the first change request with the distributed lock and the local memory lock.

After receiving the first response message sent by the distributed lock control node, the proxy node may add the local memory lock to the distributed lock. The local memory lock is used to control local synchronous access to the distributed lock, to protect consistency of a state of the distributed lock within the single proxy node.

In a process of directly or indirectly changing the target metadata of the target file according to the first change request, if it is ensured that the distributed lock distributed to the proxy node is not revoked (that is, not captured by another proxy node), the problem of errors in the metadata due to inconsistency between the target metadata buffered in the proxy node and the true target metadata in the NAS cluster does not occur.

The local memory lock can enable only a thread in local threads which holds the distributed lock to execute the first change request on the target file to run, and enable other threads to be in a waiting state. In this way, in an operation process corresponding to the first change request, if the distributed lock control node sends a revoke request (the revoke request is used to revoke the distributed lock held by the proxy node) to the proxy node according to a change request of another proxy node, because the memory lock is added to the distributed lock, the proxy node does not respond to the revoke request, until the operation corresponding to the first change operation is completed. In this way, when the proxy node performs the operation corresponding to the first change request on the target metadata (for example, the size of the target file) of the target file according to the distributed lock, the distributed lock of the proxy node can be prevented from being invalid due to revocation of the distributed lock.

The first change request is the file adding write request of the target file, where the request changes the file size of the target file. After receiving the file adding write request, the proxy node A may apply for a distributed lock to the distributed lock control node of the NAS cluster.

After receiving the application, the distributed lock control node allocates the distributed lock to the proxy node. After allocating the distributed lock to the proxy node A, the distributed lock control node may send the first response message to the proxy node A, that is, the proxy node A holds the distributed lock.

After receiving the first response message, the proxy node A may add the memory lock to the distributed lock held by the proxy node A. The proxy node A adds new content (the new content may be content indicated by the file adding write request) to the target file according to the first change request with the distributed lock and the memory lock.

In the process in which the proxy node A adds the new content to the target file, the distributed lock control node receives a file size update request for the target file from the proxy node B. After receiving the file size update request, the distributed lock control node detects that the proxy node A currently holds the distributed lock, and therefore sends a revoke request to the proxy node A.

After the proxy node A receives the revoke request, because the memory lock is added to the distributed lock, the revoke request is not run in the process in which the proxy node A adds the new content to the target file and updates the file size of the target file in the buffer of the proxy node A. After the proxy node A adds the new content to the target file, and updates the file size of the target file in the buffer of the proxy node A, the revoke request may be run, and the distributed lock held by the proxy node A may be revoked according to the revoke request, and the file size of the target file in the local buffer may be cleared.

In this embodiment, by receiving, by a proxy node, a first change request for a target file in a NAS cluster, where the first change request is used to directly or indirectly trigger to change target metadata of the target file; allocating, by a distributed lock control node in the NAS cluster in response to the first change request, a corresponding distributed lock, and returning first response message to the proxy node, where the distributed lock is used to control exclusive access of shared data in the NAS cluster, and the first response message is used to notify that the distributed lock is successfully allocated; receiving, by the proxy node, the first response message, and configuring a corresponding local memory lock for the distributed lock corresponding to the first change request, where the local memory lock is used to control local synchronous access to the distributed lock, to protect consistency of a state of the distributed lock inside the single proxy node; and controlling a change of the target metadata of the target file in the NAS cluster based on the first change request with the distributed lock and the local memory lock. This resolves the problem of errors in the target metadata caused by concurrent modifications of a plurality of proxy nodes on the target metadata of the file.

In some embodiments, the foregoing step S203 includes:

first, after adding the memory lock to the distributed lock, detecting whether the distributed lock is currently valid; and second, sending the first change request to a data block access node of the NAS cluster in response to detecting that the distributed lock is valid, so that the data block access node changes the file content of the target file.

After adding the memory lock to the distributed lock, the proxy node detects whether the distributed lock is still valid (whether the distributed lock is still held). For example, the proxy node searches for whether the revoke request is received in a process of adding the memory lock to the distributed lock and whether the proxy node has responded to the revoke request. If the revoke request is not received, or the revoke request is received but the revoke request is not responded, the proxy node may consider that the distributed lock held by the proxy node is still valid after the memory lock is added. If the distributed lock added with the local memory lock is valid, the proxy node may send the first change request with the distributed lock and the memory lock to the data block service node. After receiving the first change request, the data block service node performs an operation corresponding to the first change request on the target file in response to the first change request, so as to cause a change to the target metadata of the target file. After the data block service node performs the foregoing operation, the proxy node may obtain target metadata after the foregoing operation, for buffering. After the first change request is completed, the proxy node may release the memory lock and the distributed lock.

In some embodiments, the foregoing step S203 includes the following steps:

first, releasing, by the proxy node, the memory lock in response to detecting that the distributed lock is invalid, and re-sending a distributed lock request to the distributed lock control node; and second, reconfiguring, after the first response message of re-allocating a distributed lock by the distributed lock control node for the first change request is obtained, a the local memory lock for the allocated distributed lock.

In these embodiments, after the memory lock is added to the distributed lock, whether the distributed lock is still valid (whether the distributed lock is still held) is detected. If the distributed lock is invalid, it indicates that the distributed lock of the proxy node is revoked in the process of applying for the distributed lock and configuring the memory lock for the distributed lock. In other words, the proxy node has lost the distributed lock, and needs to reapply for the distributed lock from the distributed lock control node. Therefore, the proxy node needs to release the memory lock, and re-apply for a distributed lock. After the distributed lock is re-obtained, a local memory lock is configured for the distributed lock.

FIG. 3 is a flowchart 2 of a data access method according to the present disclosure. As shown in FIG. 3, the method includes the following steps.

S301, receiving, by a proxy node, a first change request for a target file in a NAS cluster, wherein the first change request is used to directly or indirectly trigger to change target metadata of the target file, wherein the first change request is a file adding write request.

S302, allocating, by a distributed lock control node in the NAS cluster in response to the first change request, a corresponding distributed lock, and returning first response message to the proxy node, wherein the distributed lock is used to control exclusive access of shared data in the NAS cluster, and the first response message is used to notify that the distributed lock is successfully allocated.

S303, receiving, by the proxy node, the first response message, and configuring a corresponding local memory lock for the distributed lock corresponding to the first change request, wherein the local memory lock is used to control local synchronous access to the distributed lock, to protect consistency of a state of the distributed lock within a single proxy node.

For steps S301 to S303, reference may be made to the steps S201 to S203 shown in FIG. 2, and details are not described herein again.

S304, obtaining, by the proxy node, a first file size of the target file from a distributed lock control node, wherein the distributed lock control node is configured to store the file size of the target file.

S305, determining a second file size obtained after adding the contents of the target file based on the first change request.

S306, if it is detected that the second file size is less than the first file size, changing the first change request to an overwrite request, and releasing the local memory lock, wherein the overwrite request is used to request to modify existing partial content of the target file.

S307, sending the overwrite request to the NAS cluster based on the allocated distributed lock, to cover the partial content of the target file.

The NAS cluster corresponds to a plurality of proxy nodes, and each proxy node provides services for a plurality of clients. Therefore, it is possible that different proxy nodes separately request the distributed lock control node for distributed locks respectively according to received first change requests of clients, and send the first change requests to the NAS cluster based on the distributed locks and memory locks. Due to existence of the memory locks and the distributed locks, only one proxy node can modify the target metadata of the target file at a same time. First change requests of other proxy nodes are in a waiting state. If a distributed lock is allocated to one of the other proxy nodes in the waiting state, the another proxy node may add a memory lock to the held distributed lock. After the another proxy node adds the memory lock to the distributed lock, a file size obtaining request for the target file may be sent to the distributed lock control node in the NAS cluster.

The distributed lock control node may send the stored first file size of the target file to the proxy node according to the file size request. After receiving the first file size sent by the distributed lock control node, the proxy node may determine the second file size obtained after content adding of the target file is performed as indicated by the first change request of the proxy node. Then, whether the first file size is less than or equal to the second file size is determined. If yes, it means that another proxy node has added content to the target file, and the first file size obtained after content adding is performed has exceeded the file size corresponding to the request of the current proxy node. In this way, after the operation corresponding to the first change request corresponding to the current proxy node is performed, the file size of the target file is not changed. In this way, in a process in which the current proxy node performs the operation corresponding to the first change request, even if the allocated distributed lock is revoked, confusion of the metadata is not caused, and therefore the local memory lock can be released. After the local memory lock is released, when other proxy nodes initiate concurrent adding write, the distributed lock can be immediately obtained, so as to improve concurrency performance between the plurality of proxy nodes.

For example, three proxy nodes initiate concurrent adding write to the target file: the proxy node 1 writes [0M, 100M), the proxy node 2 writes [0M, 200M), and the proxy node 3 writes [200M, 300M). Assuming that the proxy node 2 first captures a size distributed write lock and adds a memory lock, distributed lock application of the proxy node 1 and the proxy node 3 is blocked. After the proxy node 2 completes adding write and releasing the memory lock, assuming that the proxy node 1 grabs the distributed lock before the proxy node 3, after the proxy node 1 obtains the distributed lock and adds the memory lock, if it is detected that the file adding write request of the proxy node 1 becomes the overwrite request, the proxy node 1 can immediately release the memory lock. After the proxy node 1 releases the memory lock, the proxy node 3 can successfully apply for the distributed lock. Therefore, the proxy node 1 and the proxy node 3 can implement concurrent adding write requests for the target file.

In this embodiment, it is described that, after the proxy node configures the memory lock for the distributed lock, if it is detected that the file adding write request becomes the overwrite request, the memory lock is released, so that concurrency performance between the plurality of proxy nodes can be improved.

In some embodiments, the target metadata is used to represent the file size of the target file. Step S203 of the embodiment shown in FIG. 2 and step S303 of the embodiment shown in FIG. 3 include:

if the first change request is the file adding write request, configuring a local memory read lock for the distributed lock; or if the first change request is the metadata update change, configuring a local memory write lock for the distributed lock, wherein memory locks corresponding to a same piece of metadata have the following mutual exclusion rules: memory read locks are compatible with each other; the memory read lock is mutually exclusive with the memory write lock, and memory write locks are mutually exclusive with each other.

In some application scenarios, the first change request is the file adding write request for adding the content of the target file. Because each proxy node provides services for a plurality of clients, each client may send a file adding write request. Therefore, each proxy node corresponds to a plurality of concurrent adding write requests, and therefore adding write performance of a single proxy node needs to be ensured. Memory read locks are configured for the file adding write requests. Because the read locks are compatible with each other, if the memory read locks are used for a plurality of adding write requests, the proxy node can concurrently send the file adding write requests to the data block service node of the NAS cluster, to improve concurrency performance of the file adding write requests.

If the foregoing constraint is not exerted on the concurrent adding write requests in the proxy node, it is assumed that a thread 1 of the proxy node first completes adding content writing of [1M, 2M) of the target file in the data block service node, and then modifies the file size to 2M. Then, a thread 2 completes adding content writing of [0, 1M) of the target file in the data block service node, and then modifies the file size to 1M. However, the distributed lock control node processes the file adding write request of the thread 2 as the overwrite request. Therefore, the file adding write request of the thread 2 does not update the file size of the target file of the distributed lock control node, that is, the file size of the target file in the distributed lock control node is 2M. However, the file size buffered in the proxy node is 1M. As a result, the file size in the proxy node is consistent with the file size of the target file stored in the distributed lock control node.

Therefore, in a scenario of concurrent adding write requests, for a plurality of received adding write requests, the proxy node determines second file sizes that are obtained after the first change request is executed on the target file and that respectively correspond to the file adding write requests. Only a file adding write request whose corresponding second file size is greater than or equal to second file sizes corresponding to other adding write requests is executed, that is, only the file adding write request that increases the file size is executed, so as to ensure consistency between file sizes of the target file. After the data block service node completes content adding on the target file, the proxy node may update the file size of the target file.

In some application scenarios, the first change request is an update request of the target metadata. Different update requests for the target metadata need to be mutually exclusive with each other in a same proxy node. Otherwise, the target metadata of the target file in the proxy node is consistent with the target metadata of the target file in the data block service node.

It is assumed that the current file size of the target file is 1M, and two threads in the same proxy node concurrently initiate update requests to the target metadata. An update request 1 of the thread 1 updates the file size to 0M; and an update request 2 of the thread 2 updates the file size of the target file to 2M. The proxy node sends the update request 1 and the update request 2 to the data block service node at the same time. It is assumed that the data block service node first completes the update request 1, and then completes the update request 2. Finally, the data block service node modifies the file size of the target file to 2M. However, when processing the two update requests, the proxy node cannot ensure a sequence of sending the update requests to the NAS cluster. If the update request 1 is sent after the update request 2, the proxy node updates the file size of the target file in the data block service node to 0 based on the memory read lock and the distributed lock, and the file size in the data block service node may be synchronized to the distributed lock control node for storage. The file size buffered in the proxy node is 2M. Therefore, concurrency of the update requests causes inconsistency between the target metadata of the target file in the proxy node and the target metadata of the target file in the distributed lock control node. Therefore, a memory write lock needs to be configured for an update request for the target metadata, to ensure consistency of the target metadata.

In these embodiments, a memory read lock is added to a file adding write request, and a memory write lock is added to an update request, so that a concurrency processing capability of a single proxy node can be improved when consistency of the target metadata of the target file is ensured.

FIG. 4 is a flowchart 3 of a data access method according to the present disclosure. As shown in FIG. 4, the method includes the following steps:

S401, receiving, by the proxy node, a read request for the target metadata of the target file.

S402, determining, by the distributed lock control node in the NAS cluster in response to the read request, a distributed read lock of the read request, and determining whether a distributed lock mutually exclusive with the distributed read lock exists.

S403, if it is determined that the distributed lock mutually exclusive with the distributed read lock exists, feeding back second response information to the proxy node, wherein the second response information comprises rejection information of rejecting to allocate the corresponding distributed read lock to the proxy node.

S404, sending temporary target metadata to the proxy node, so that the proxy node returns the temporary target metadata to a client which sent the read request.

In this embodiment, the proxy node may receive a read request for the target metadata of the target file from the client. The proxy node sends a distributed read lock request to the distributed lock control node according to the received read request for the target metadata. Because the request is a metadata read request, the read request does not change the size of the metadata.

After the distributed lock control node receives the request from the proxy node for applying for a read lock for the target metadata (for example, the size of the target file), to reduce impact of unnecessary distributed lock revocation on execution of the first change request, if the distributed lock control node detects that a distributed lock has been allocated to the first change request of another proxy node, the distributed lock control node may reject to allocate a distributed read lock to the read request from the proxy node, and only returns a temporary file size to the proxy node. The temporary file size may be the file size of the target file stored in the distributed lock control node. After receiving the temporary file size, the proxy node may use temporary metadata in context of an operation correspond-
ing to the client request, and does not buffer the temporary
metadata.

In this embodiment, it is described that, if the proxy node
receives the read request for the target metadata of the target
file, the proxy node may send the distributed read lock
request to the distributed lock control node; if another proxy
node uses a distributed lock mutually exclusive with the
distributed read lock, the distributed lock control node does
not allocate the distributed read lock to the request, obtains
the temporary target metadata, and returns the temporary
target metadata, so as to reduce competitions for the dis-
tributed lock between a plurality of proxy nodes, thereby
improving concurrent read and write performance.

In the embodiment shown in FIG. 4, the method further
includes the following steps:

First, if it is determined that there is no distributed lock
mutually exclusive with the distributed read lock corre-
sponding to the read request, allocating the distributed read
lock to the read request, and returning third response infor-
mation to the proxy node, where the third response infor-
mation includes information that the distributed read lock is
successfully allocated to the read request; and Second, the proxy node reads information about the target
metadata from the NAS cluster based on the distributed read
lock. In some application scenarios, if the distributed lock
control node detects that no distributed write lock has been
allocated to another proxy node, a distributed lock may be
allocated to the read lock request.

In some application scenarios, if the distributed lock
control node detects that a distributed lock allocated to the
first change request of another proxy node has been revoked,
a distributed read lock may be allocated to the read request
for the target metadata from the proxy node. The proxy node
may read the information about the target metadata from the
distributed lock control node of the NAS cluster based on the
allocated distributed read lock.

In some embodiments, the distributed lock control node
may revoke the distributed lock based on one or more of the
following:

duration in which another proxy node holds the distrib-
        uted lock exceeds first preset duration; and
    another proxy node holding the distributed lock does not
        perform the operation corresponding to the first change
        request within second preset duration.

In other words, if a distributed lock is allocated to another
proxy node, after duration in which the another proxy node
holds the distributed write lock exceeds the first preset
duration, the distributed lock of the another proxy node can
be revoked.

Alternatively, if another proxy node holding the distrib-
uted write lock does not perform an operation that directly
or indirectly causes update to the target metadata within the
second preset duration, the distributed lock allocated to the
another proxy node can be revoked.

The first preset duration and the second preset duration
may be set according to a specific application scenario. This
is not limited herein.

By using the foregoing revocation condition, the distrib-
uted lock held by the proxy node can be revoked when there
is no conflict of another write request, to allocate a distrib-
uted read lock to another request.

After the distributed lock control node receives the
request from the proxy node for applying for a distributed
read lock, to reduce impact of unnecessary revocation of the
distributed lock allocated to the first change request on
execution of the operation corresponding to the first change request, after the distributed lock control node finds that a
distributed lock has been allocated to the first change request
of another proxy node, the distributed lock control node may
not allocate a distributed read lock to the proxy node, and
only returns temporary size metadata.

However, if temporary size metadata is returned upon
application for a read lock each time, assuming that there is
no first change request subsequently, and the target metadata
no longer changes, for the read request for the target
metadata from another proxy node each time, a remote
process invocation needs to be sent to the distributed lock
control node to obtain the file size of the target file, affecting
performance of the distributed lock control node.

Therefore, in a scenario in which the target metadata of
the target file does not change for a long time, the distributed
lock control node may revoke the distributed lock allocated
to the first change request, and allocate a distributed read
lock to a read request for the target metadata, and the proxy
node may obtain the target metadata from the distributed
lock control node according to the distributed read lock. In
this way, when the proxy node holding the distributed read
lock subsequently receives a target metadata read request for
the target file of the client, the proxy node may directly read
the target metadata from a buffer of the proxy node, and
return the target metadata to the client, to reduce resource
overheads required for sending a remote process invocation
to the distributed lock control node.

Figure 5:
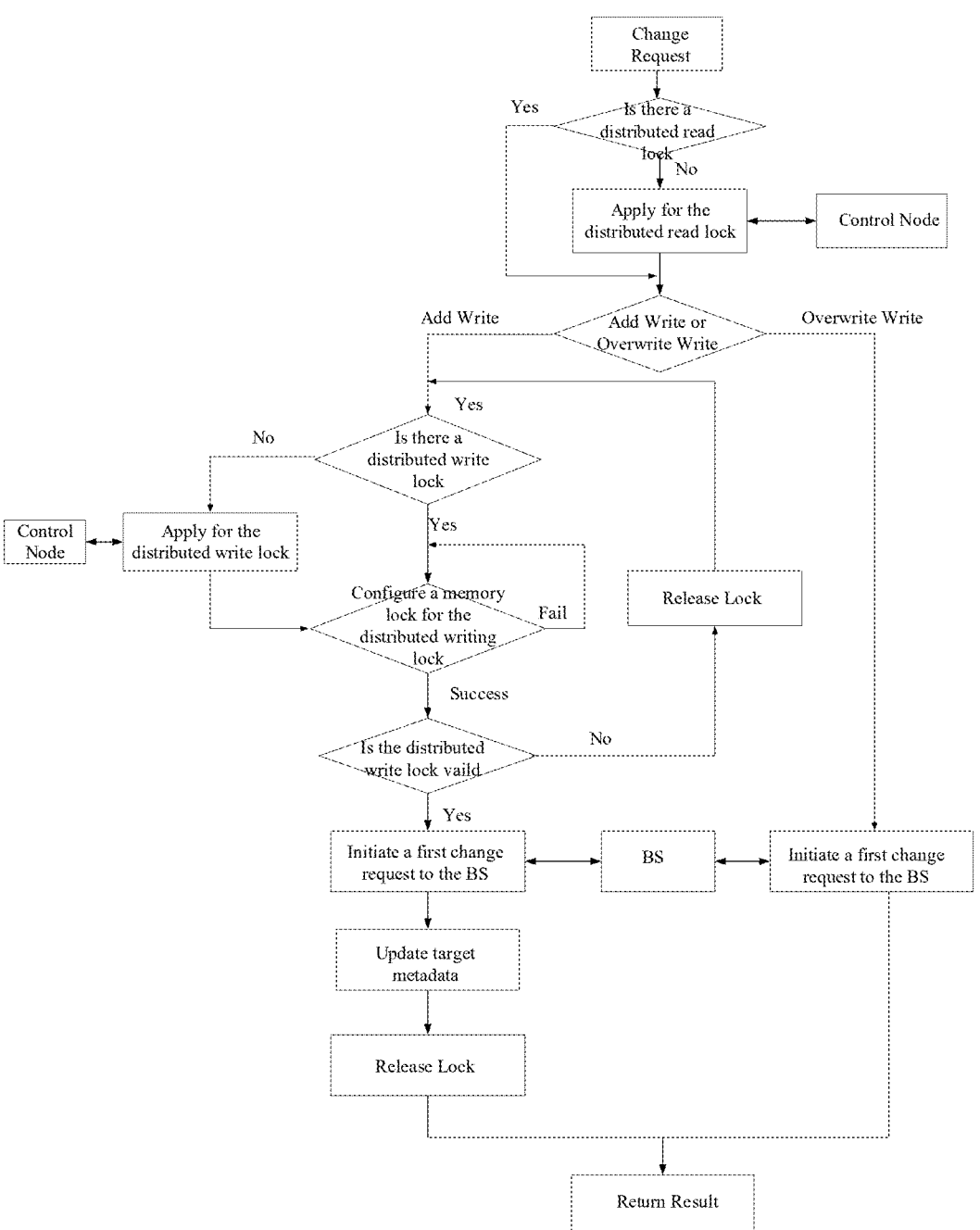
FIG. 5 is a flowchart 3 of a data access method according to an embodiment of the present disclosure.

As an exemplary description, FIG. 5 is a schematic
diagram of an application scenario. As shown in FIG. 5, after
receiving the first change request, the proxy node determines
that the first change request is a write request for writing into
file content of the target file. The proxy node detects whether
the proxy node holds a distributed read lock. In response to
determining that the proxy node does not hold a distributed
read lock, the proxy node applies for a distributed read lock
from the distributed lock control node. After determining
that the proxy node holds a distributed read lock, the proxy
node detects whether the foregoing write request is over-
write. If it is detected that the foregoing write request is
overwrite, an overwrite request is sent to the NAS cluster
(for example, to the data block service node) by using a
distributed read request, to cover existing partial content of
the target file. In addition, a return result fed back by the
NAS cluster according to the foregoing overwrite request is
received. Overwrite does not update the file size of the target
file.

If it is detected that the foregoing write request is a file
adding write request, the proxy node detects whether the
proxy node holds a distributed write lock, and if the proxy
node does not hold a distributed write lock, the proxy node
applies for a distributed write lock from the distributed lock
control node. After the first response message that the
distributed write lock has been allocated to the first change
request and that is returned by the distributed lock control
node is received, the local memory lock may be added to the
distributed write lock of the first change request. If adding
of the memory lock fails, a memory lock is re-added to the
distributed write lock. If the memory lock is successfully
added to the distributed lock, whether the distributed lock to
which the memory lock is added is still valid may be
detected. If the distributed lock to which the memory lock is
added is invalid, the proxy node reapplies for a distributed
memory write lock from the distributed lock control node,
and then adds a memory lock to the distributed memory
write lock allocated by the distributed lock control node.

If it is detected that the distributed write lock to which the
memory lock is added is valid, the first change request with the distributed write lock and the memory lock is sent to the data block service node. The data block service node may respond to the first change request, and may complete a file adding write operation on the target file content according to the first response message. After completing the adding write operation corresponding to the first change request, the data block service node updates the file size, and stores the updated file size into the distributed lock control node. Then the proxy node releases the memory lock and the distributed write lock.

When it is determined whether the write request is adding write or overwrite, the first file size of the target file obtained from the distributed lock control node may be compared with the second file size to which the file size of the target file is changed as indicated by the first change request. If the first file size is greater than or equal to the second file size, the first change request is the overwrite request, and otherwise, the first change request is the file adding write request.

In these embodiments, to prevent revocation of a distributed write lock from occurring between application for a distributed write lock and adding of a memory lock, whether the distributed write lock is valid may be detected after the memory lock is added to the distributed write lock. If the distributed write lock is invalid, a distributed write lock is re-applied for. In this way, confusion of the target metadata caused by capture of another proxy node due to revocation of the distributed write lock between application for the distributed write lock and adding of the memory lock can be avoided.

Figure 6:
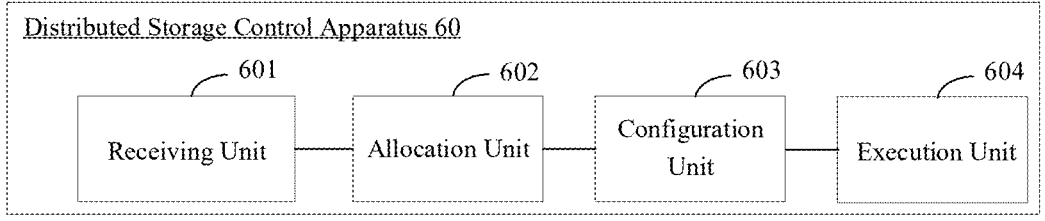
FIG. 6 is a schematic structural block diagram of a data access apparatus according to an embodiment of the present disclosure.

Corresponding to the foregoing distributed data storage control method of the embodiment of FIG. 2, FIG. 6 is a schematic structural block diagram of a distributed data storage control apparatus according to an embodiment of the present disclosure. For ease of description, only the part related to embodiments of the present disclosure is shown. With reference to FIG. 6, an apparatus 60 includes: a receiving unit 601, an allocation unit 602, a configuration unit 603, and an execution unit 604.

The receiving unit 601 is configured to receive, by a proxy node, a first change request for a target file in a NAS cluster, where the first change request is used to directly or indirectly trigger to change target metadata of the target file.

The allocation unit 602 is configured to: allocate, by a distributed lock control node in the NAS cluster in response to the first change request, a corresponding distributed lock, and return first response message to the proxy node, where the distributed lock is used to control exclusive access of shared data in the NAS cluster, and the first response message is used to notify that the distributed lock is successfully allocated.

The configuration unit 603 is configured to: receive, by the proxy node, the first response message, and configure a corresponding local memory lock for the distributed lock corresponding to the first change request, where the local memory lock is used to control local synchronous access to the distributed lock, to protect consistency of a state of the distributed lock inside the single proxy node.

The execution unit 604 is configured to control a change of the target metadata of the target file in the NAS cluster based on the first change request with the distributed lock and the local memory lock.

In some embodiments, the target metadata is used to represent a file size of the target file; and the first change request includes one of the following:

a file adding write request, where the file adding write request is used to request to add file content to the target file, and change of the metadata of the target file is triggered when execution of a file content adding operation corresponding to the file adding write request is completed; or, a metadata update request, where the metadata update request is used to request to change the metadata of the target file.

In some embodiments, if the first change request is the file adding write request, the receiving unit 601 is further configured to:

if the first change request is the file adding write request, configure a local memory read lock for the distributed lock; or if the first change request is the metadata update change, configure a local memory write lock for the distributed lock, where memory locks corresponding to a same piece of metadata have the following mutual exclusion rules: memory read locks are compatible with each other; the memory read lock is mutually exclusive with the memory write lock, and memory write locks are mutually exclusive with each other.

In some embodiments, the execution unit 603 is further configured to:

detect whether the distributed lock is currently valid; and send, by the proxy node, the first change request to a data block access node of the NAS cluster in response to detecting that the distributed lock is valid, so that the data block access node completes an operation corresponding to the first change request.

In some embodiments, the execution unit 603 is further configured to:

release, by the proxy node, the memory lock in response to detecting that the distributed lock is invalid, and re-send a distributed lock request to the distributed lock control node; and reconfigure, after the first response message of re-allocating a distributed lock by the distributed lock control node for the first change request is obtained, a local memory lock for the allocated distributed lock.

In some embodiments, the first change request is the file adding write request, and after the configuring, by the proxy node, a corresponding local memory lock for the distributed lock corresponding to the first change request, the method further includes:

obtaining, by the proxy node, a first file size of the target file from the distributed lock control node, where the distributed lock control node is configured to store the file size of the target file;

determining a second file size obtained after the content is added to content of the target file;

if it is detected that the second file size is less than the first file size, changing the first change request to an overwrite request, and releasing the local memory lock, where the overwrite request is used to request to modify existing partial content of the target file; and sending the overwrite request to the NAS cluster based on the allocated distributed lock, to cover the partial content of the target file.

In some embodiments, the apparatus further includes a reading unit (not shown in the figure), and the reading unit is configured to:

receive, by the proxy node, a read request for the target metadata of the target file;

determine, by the distributed lock control node in the NAS cluster in response to the read request, a distributed read lock of the read request, and determine whether there is a distributed lock mutually exclusive with the distributed read lock;

if it is determined that there is the distributed lock mutually exclusive with the distributed read lock, feed back second response information to the proxy node, where the second response information includes rejection information of rejecting to allocate the corresponding distributed read lock to the proxy node; and send temporary target metadata to the proxy node, so that the proxy node returns the temporary target metadata to a client sending the read request.

In some embodiments, the apparatus further includes a reading unit, further configured to:

if it is determined that there is no distributed lock mutually exclusive with the distributed read lock corresponding to the read request, allocate the distributed read lock to the read request, and return third response information to the proxy node, where the third response information includes information that the distributed read lock is successfully allocated to the read request; and read, by the proxy node based on the distributed read lock, information about the target metadata from the NAS cluster.

In order to realize the above embodiment, the embodiment of the present disclosure further provides an electronic device.

Figure 7:
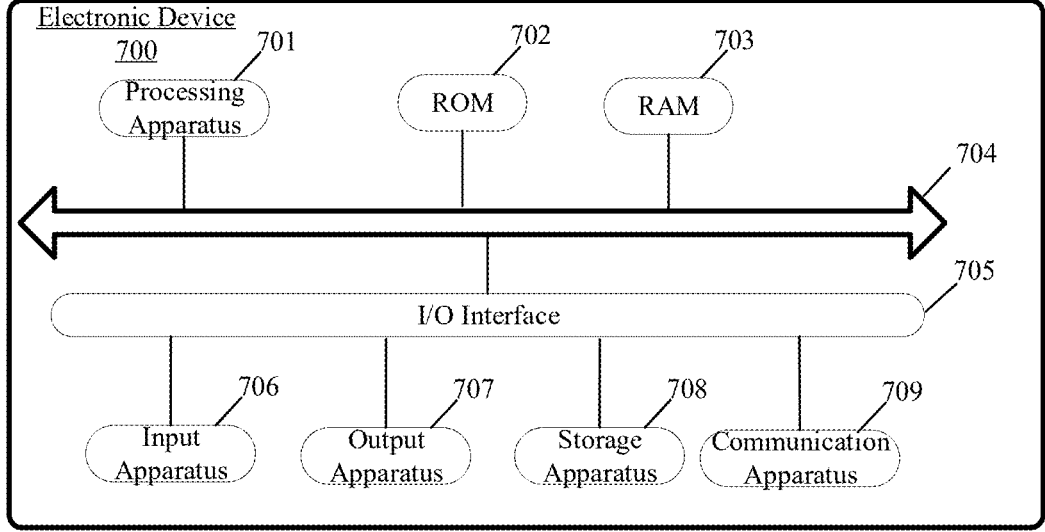
FIG. 7 is a schematic diagram of a hardware structure of an electronic device according to an embodiment of the present disclosure.

Referring to FIG. 7, FIG. 7 illustrates a schematic structural diagram of an electronic device 700 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 7 is merely an example, and should not pose any limitation to the functions and the range of use of the embodiments of the present disclosure.

As illustrated in FIG. 7, the electronic device 700 may include a processing apparatus 701 (e.g., a central processing unit, a graphics processing unit, etc.), which can perform various suitable actions and processing according to a program stored in a read-only memory (ROM) 702 or a program loaded from a storage apparatus 708 into a random-access memory (RAM) 703. The RAM 703 further stores various programs and data required for operations of the electronic device 700. The processing apparatus 701, the ROM 702, and the RAM 703 are interconnected by means of a bus 704. An input/output (I/O) interface 705 is also connected to the bus 704.

Usually, the following apparatus may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the electronic device 700 to be in wireless or wired communication with other devices to exchange data. While FIG. 7 illustrates the electronic device 700 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 709 and installed, or may be installed from the storage apparatus 708, or may be installed from the ROM 702. When the computer program is executed by the processing apparatus 701, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to perform the method shown in the above embodiments.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A distributed data storage control method, comprising:
receiving, by a proxy node, a first change request for a target file in a NAS cluster, wherein the first change request is used to directly or indirectly trigger to change target metadata of the target file;
allocating, by a distributed lock control node in the NAS cluster in response to the first change request, a corresponding distributed lock, and returning first response message to the proxy node, wherein the distributed lock is used to control exclusive access of shared data in the NAS cluster, and the first response message is used to notify that the distributed lock is successfully allocated;
receiving, by the proxy node, the first response message, and configuring a corresponding local memory lock for the distributed lock corresponding to the first change request, wherein the local memory lock is used to control local synchronous access to the distributed lock, to protect consistency of a state of the distributed lock within a single proxy node; and
controlling a change of the target metadata of the target file in the NAS cluster based on the first change request with the distributed lock and the local memory lock.

2. The method according to claim 1, wherein the target metadata is used to represent a file size of the target file; and the first change request comprises one of the following:

a file adding write request, wherein the file adding write request is used to request to add file content to the target file, and change of the metadata of the target file is triggered when execution of a file content adding operation corresponding to the file adding write request is completed; or, a metadata update request, wherein the metadata update request is used to request to change the metadata of the target file.

3. The method according to claim 2, wherein the receiving, by the proxy node, the first response message, and configuring a corresponding local memory lock for the distributed lock corresponding to the first change request comprises:

when the first change request is the file adding write request, configuring a local memory read lock for the distributed lock; or when the first change request is the metadata update change, configuring a local memory write lock for the distributed lock, wherein memory locks corresponding to a same piece of metadata have the following mutual exclusion rules: memory read locks are compatible with each other; the memory read lock is mutually exclusive with the memory write lock, and memory write locks are mutually exclusive with each other.

4. The method according to claim 2, wherein the controlling a change of the target metadata of the target file in the NAS cluster based on the first change request with the distributed lock and the local memory lock comprises:

detecting whether the distributed lock is currently valid; and sending, by the proxy node, the first change request to a data block access node of the NAS cluster in response to detecting that the distributed lock is valid, to control the data block access node to perform an operation corresponding to the first change request.

5. The method according to claim 4, wherein the controlling a change of the target metadata of the target file in the NAS cluster based on the first change request with the distributed lock and the local memory lock further comprises:

releasing, by the proxy node, the memory lock in response to detecting that the distributed lock is invalid, and re-sending a distributed lock request to the distributed lock control node; and reconfiguring, after the first response message of re-allocating a distributed lock by the distributed lock control node for the first change request is obtained, the local memory lock for the allocated distributed lock.

6. The method according to claim 2, wherein the first change request is the file adding write request, and after the configuring, by the proxy node, a corresponding local memory lock for the distributed lock corresponding to the first change request, the method further comprises:

obtaining, by the proxy node, a first file size of the target file from a distributed lock control node, wherein the distributed lock control node is configured to store the file size of the target file;

determining a second file size obtained after adding the contents of the target file based on the first change request;

when it is detected that the second file size is less than the first file size, changing the first change request to an overwrite request, and releasing the local memory lock, wherein the overwrite request is used to request to modify existing partial content of the target file; and sending the overwrite request to the NAS cluster based on the allocated distributed lock, to cover the partial content of the target file.

7. The method according to claim 1, wherein the method further comprises:

receiving, by the proxy node, a read request for the target metadata of the target file;

determining, by the distributed lock control node in the NAS cluster in response to the read request, a distributed read lock of the read request, and determining whether a distributed lock mutually exclusive with the distributed read lock exists;

when it is determined that the distributed lock mutually exclusive with the distributed read lock exists, feeding back second response information to the proxy node, wherein the second response information comprises rejection information of rejecting to allocate the corresponding distributed read lock to the proxy node; and sending temporary target metadata to the proxy node, so that the proxy node returns the temporary target metadata to a client which sent the read request.

8. The method according to claim 7, wherein the method further comprises:

when it is determined that the distributed lock mutually exclusive with the distributed read lock corresponding to the read request does not exist, allocating the distributed read lock to the read request, and returning third response information to the proxy node, wherein the third response information comprises information that the distributed read lock is successfully allocated to the read request; and reading, by the proxy node based on the distributed read lock, information of the target metadata from the distributed lock control node.

9. A distributed data storage control apparatus, comprising:

at least one processor, and a non-transitory memory with instructions thereon, wherein the instructions upon execution by the processor, cause the processor to:

receive, by a proxy node, a first change request for a target file in a NAS cluster, wherein the first change request is used to directly or indirectly trigger to change target metadata of the target file;

allocate, by a distributed lock control node in the NAS cluster in response to the first change request, a corresponding distributed lock, and return first response information to the proxy node, wherein the distributed lock is used to control exclusive access of shared data in the NAS cluster, and the first response information is used to notify that the distributed lock is successfully allocated;

receive, by the proxy node, the first response information, and configure a corresponding local memory lock for the distributed lock corresponding to the first change request, wherein the local memory lock is used to control local synchronous access to the distributed lock, to protect consistency of a state of the distributed lock within a single proxy node; and control change of the target metadata of the target file in the NAS cluster based on the first change request with the distributed lock and the local memory lock.

10. The apparatus according to claim 9, wherein the target metadata is used to represent a file size of the target file; and the first change request comprises one of the following:

a file adding write request, wherein the file adding write request is used to request to add file content to the target file, and change of the metadata of the target file is triggered when execution of a file content adding operation corresponding to the file adding write request is completed; or, a metadata update request, wherein the metadata update request is used to request to change the metadata of the target file.

11. The apparatus according to claim 10, wherein the receive, by the proxy node, the first response information, and configure a corresponding local memory lock for the distributed lock corresponding to the first change request comprises:

when the first change request is the file adding write request, configure a local memory read lock for the distributed lock; or when the first change request is the metadata update change, configure a local memory write lock for the distributed lock, wherein memory locks corresponding to a same piece of metadata have the following mutual exclusion rules: memory read locks are compatible with each other; the memory read lock is mutually exclusive with the memory write lock, and memory write locks are mutually exclusive with each other.

12. The apparatus according to claim 10, wherein the control change of the target metadata of the target file in the NAS cluster based on the first change request with the distributed lock and the local memory lock comprises:

detect whether the distributed lock is currently valid; and send, by the proxy node, the first change request to a data block access node of the NAS cluster in response to detecting that the distributed lock is valid, to control the data block access node to perform an operation corresponding to the first change request.

13. The apparatus according to claim 12, wherein the control change of the target metadata of the target file in the NAS cluster based on the first change request with the distributed lock and the local memory lock further comprises:

release, by the proxy node, the memory lock in response to detecting that the distributed lock is invalid, and re-sending a distributed lock request to the distributed lock control node; and reconfigure, after the first response information of re-allocating a distributed lock by the distributed lock control node for the first change request is obtained, the local memory lock for the allocated distributed lock.

14. The apparatus according to claim 10, wherein the first change request is the file adding write request, and after the configuring, by the proxy node, a corresponding local memory lock for the distributed lock corresponding to the first change request, the method further comprises:

obtain, by the proxy node, a first file size of the target file from a distributed lock control node, wherein the distributed control node distributed lock control node is configured to store the file size of the target file;

determine a second file size obtained after adding the contents of the target file based on the first change request;

when it is detected that the second file size is less than the first file size, change the first change request to an overwrite request, and releasing the local memory lock, wherein the overwrite request is used to request to modify existing partial content of the target file; and send the overwrite request to the NAS cluster based on the allocated distributed lock, to cover the partial content of the target file.

15. The apparatus according to claim 9, the processor is further caused to:

receive, by the proxy node, a read request for the target metadata of the target file;

determine, by the distributed lock control node in the NAS cluster in response to the read request, a distributed read lock of the read request, and determining whether a distributed lock mutually exclusive with the distributed read lock exists;

when it is determined that the distributed lock mutually exclusive with the distributed read lock exists, feed back second response information to the proxy node, wherein the second response information comprises rejection information of rejecting to allocate the corresponding distributed read lock to the proxy node; and send temporary target metadata to the proxy node, so that the proxy node returns the temporary target metadata to a client which sent the read request.

16. The apparatus according to claim 15, the processor is further caused to:

when it is determined that the distributed lock mutually exclusive with the distributed read lock corresponding to the read request does not exist, allocate the distributed read lock to the read request, and return third response information to the proxy node, wherein the third response information comprises information that the distributed read lock is successfully allocated to the read request; and read, by the proxy node based on the distributed read lock, information of the target metadata from the distributed lock control node.

17. A non-transitory computer-readable storage medium storing instructions that cause at least a processor to:

receive, by a proxy node, a first change request for a target file in a NAS cluster, wherein the first change request is used to directly or indirectly trigger to change target metadata of the target file;

allocate, by a distributed lock control node in the NAS cluster in response to the first change request, a corresponding distributed lock, and return first response information to the proxy node, wherein the distributed lock is used to control exclusive access of shared data in the NAS cluster, and the first response information is used to notify that the distributed lock is successfully allocated;

receive, by the proxy node, the first response information, and configure a corresponding local memory lock for the distributed lock corresponding to the first change request, wherein the local memory lock is used to control local synchronous access to the distributed lock, to protect consistency of a state of the distributed lock within a single proxy node; and control change of the target metadata of the target file in the NAS cluster based on the first change request with the distributed lock and the local memory lock.

18. The non-transitory computer-readable storage medium according to claim 17, wherein the target metadata is used to represent a file size of the target file; and the first change request comprises one of the following:

a file adding write request, wherein the file adding write request is used to request to add file content to the target file, and change of the metadata of the target file is triggered when execution of a file content adding operation corresponding to the adding write request the file adding write request is completed; or, a metadata update request, wherein the metadata update request is used to request to change the metadata of the target file.

19. The non-transitory computer-readable storage medium according to claim 18, wherein the receive, by the proxy node, first response information, and configure a corresponding local memory lock for the distributed lock corresponding to the first change request comprises:

when the first change request is the file adding write request, configure a local memory read lock for the distributed lock; or when the first change request is the metadata update change, configure a local memory write lock for the distributed lock, wherein memory locks corresponding to a same piece of metadata have the following mutual exclusion rules: memory read locks are compatible with each other; the memory read lock is mutually exclusive with the memory write lock, and memory write locks are mutually exclusive with each other.

20. The non-transitory computer-readable storage medium according to claim 18, wherein the first change request is the file adding write request, and after the configuring, by the proxy node, a corresponding local memory lock for the distributed lock corresponding to the first change request, the method further comprises:

obtain, by the proxy node, a first file size of the target file from a distributed lock control node, wherein the distributed control node distributed lock control node is configured to store the file size of the target file;

determine a second file size obtained after adding the contents of the target file based on the first change request;

when it is detected that the second file size is less than the first file size, change the first change request to an overwrite request, and releasing the local memory lock, wherein the overwrite request is used to request to modify existing partial content of the target file; and send the overwrite request to the NAS cluster based on the allocated distributed lock, to cover the partial content of the target file.

\* \* \* \* \*